UNITED STATES PATENT OFFICE.

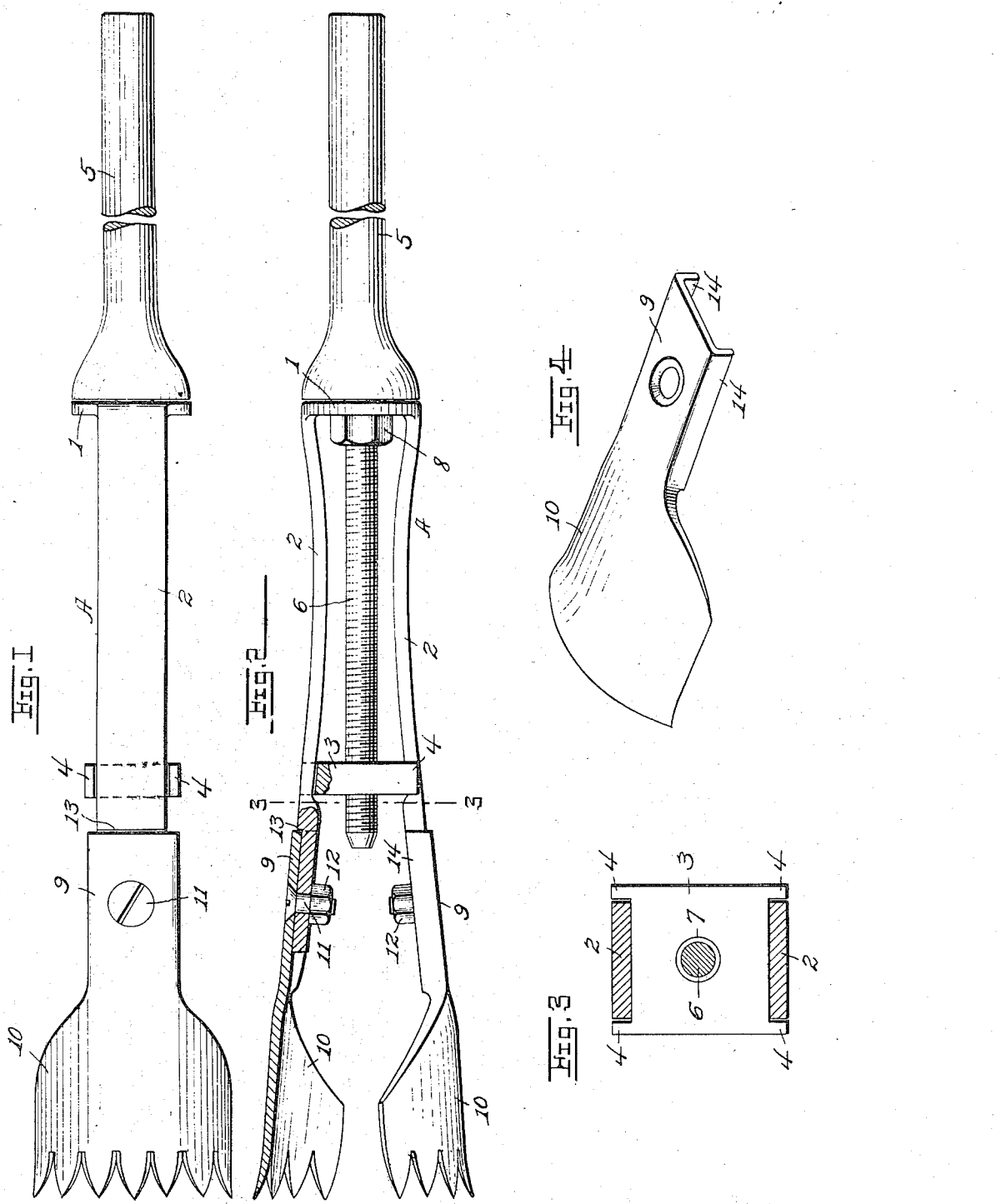

HARPER E. STRATTON, OF EMPIRE, OHIO.

TUBE-CLEANER.

1,141,433.  Specification of Letters Patent.  Patented June 1, 1915.

Application filed November 24, 1913. Serial No. 802,645.

*To all whom it may concern:*

Be it known that I, HARPER E. STRATTON, a citizen of the United States of America, and resident of Empire, county of Jefferson, and State of Ohio, have invented certain new and useful Improvements in Tube-Cleaners, of which the following is a specification.

This invention relates to improvements in pipe and tube cleaners, and it has for its primary object to provide a simple, inexpensive and durable tool for removing scale, hardened sediment and other collected foreign substance from pipes, boiler tubes, and the like.

A further object is to provide a cutting tool adapted for insertion within a pipe or tube and to be manually operated for dislodging scale and hardened or incrusted matter collected therein. And a still further object is to provide a tool of the character mentioned which is adjustable to fit tubes of varying sizes and which is provided with detachable cutting blades.

With these and other objects in view, the invention finally resides in the features of construction, arrangement of parts and combinations of elements which will hereinafter be fully described, reference being had to the accompanying drawings, forming a part of this specification, in which—

Figure 1 is an elevation of the invention; Fig. 2 is a view partly in elevation and partly in longitudinal section; Fig. 3 is a transverse section on the line 3—3, Fig. 2; and Fig. 4 is a perspective view of a cutting blade, detached, the same being shown with a plain cutting edge.

Referring to said drawings, in which like designating characters distinguish like parts throughout the several views—A indicates a one-piece yoke comprising a base member 1 and a pair of forwardly-extending oppositely-disposed arms 2, the latter being flexible and relatively movable with a normal tendency to more or less closely approach each other. Said arms have their opposing faces inclined with respect to each other; and interposed therebetween is a longitudinally movable adjusting block or spreader 3, movement of which acts to spread, or permit a closer approach of, said arms according as the direction of movement is rearward or forward. Said block or spreader has integral lugs 4 which embrace the arms 2 at opposite sides for preventing lateral displacement of the block.

A long shaft or handle 5 by means of which the tool is handled has a threaded stem 6 formed integral therewith, which stem is projected centrally through the base member 1 of the yoke and is threaded through a centrally located eye 7 provided in the block or spreader 3. A nut 8 is threaded upon said stem 6 more or less close to the base-member 1 and rotates with the handle when the latter is turned for effecting movement of the spreader.

Detachably connected to the front ends of the arms 2 are the shanks 9 of a pair of cutting blades 10, each of which is substantially semi-cylindrical in form and which is sharpened at its front end to a cutting edge. Said cutting edge may be plain, as shown in Fig. 4, or it may be serrated or toothed as shown in Figs. 1 and 2, the latter form being preferable in instances where baked or solidified sediment is encountered in a tube, as in boiler tubes. Said cutting edges of the blades are outwardly flared, as illustrated, for facilitating their taking closely to the walls of a pipe or tube in which the device is employed.

Screw-headed bolts 11 are preferably employed for attaching the blades to the arms, the heads of said bolts being countersunk in the shanks 9, and nuts 12 are threaded on said bolts for maintaining an intimate relation between said shanks and said arms. The rear-ends of the shanks 9 seat against shoulders 13 provided on the arms, whereby shearing strains on the bolts, due to the forward thrusts to which the tool is subjected, are effectually resisted. Lateral inwardly directed flanges 14 formed on the opposite edges of the shanks 9 closely embrace the lateral edges of the arms 2 and serve to preserve the alinement of the blades with respect to the arms 2 of the yoke.

In practice, the tool is inserted within a pipe or tube to be cleaned, and adjustment of the blades to fit the pipe or tube is accomplished by turning the handle. Repeated forward thrusts of the tool, operated manually, acts to cut and dislodge from the pipe or tube the hardest and most stubbornly resisting character of foreign matter.

Having thus described my invention, what

I claim as new, and desire to secure by Letters Patent, is—

1. A tube cleaner comprising a yoke with integral inwardly-bowed flexible arms, having forwardly-facing shoulders provided on their outer faces, semi-cylindrical cutting blades having shanks detachably connected to said arms, the rear ends of said shanks being disposed in abutting relation to said shoulders, a block with a central threaded eye therein interposed between said arms and having its opposite edges slidably engaging the inner faces of said arms, lugs carried by said block disposed in embracing relation to the lateral edges of said arms, and a handle swiveled in said yoke and having a threaded stem directed through the eye of the block, whereby rotation of said handle accomplishes longitudinal movement of said block for adjusting the relative positions of the cutting blades.

2. A tube cleaner comprising a yoke having inwardly bowed flexible arms, a pair of semi-cylindrical scraper blades detachably connected to said arms, a handle having swivel connection with the cross member of said yoke, a longitudinally movable spreader interposed between said arms, said spreader having a threaded eye therein, and a threaded stem carried by said handle operatively disposed within the eye of said spreader.

In testimony whereof, I affix my signature in presence of two subscribing witnesses.

HARPER E. STRATTON.

Witnesses:
A. T. VAN TILBURG,
A. R. McLEAN.